United States Patent
Chen et al.

(10) Patent No.: US 6,398,325 B1
(45) Date of Patent: Jun. 4, 2002

(54) COMPUTER ENCLOSURE WITH HOOD LATCH

(75) Inventors: Yun Lung Chen; Kuo Chih Lin; Jung Chi Chen, all of Taipei (TW)

(73) Assignee: Hon Hai Precision Inc. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/755,662

(22) Filed: Jan. 5, 2001

(51) Int. Cl.[7] .................................................. H05K 5/00
(52) U.S. Cl. ................ 312/223.2; 312/265.6; 292/128; 292/31
(58) Field of Search ................... 312/265.6, 223.2, 312/263, 223.1, 257.1, 265.5; 292/128, 31, 24, 27, 124, 127, 101, 102, 98; 361/683

(56) References Cited

U.S. PATENT DOCUMENTS

| | | | | |
|---|---|---|---|---|
| 5,421,627 A | * | 6/1995 | Yane | 292/101 X |
| 5,992,955 A | * | 11/1999 | Yang | 312/265.6 |
| 6,109,710 A | * | 8/2000 | Wu et al. | 312/223.2 |
| 6,296,334 B1 | * | 10/2001 | Liao | 312/223.2 |

* cited by examiner

*Primary Examiner*—Janet M. Wilkens
(74) *Attorney, Agent, or Firm*—Wei Te Chung

(57) ABSTRACT

A computer enclosure (10) includes a chassis (20), a hood (40), a handle (54), and a latch (60) attaching the hood to the chassis. A support bracket (30) is secured in the chassis, and defines a plurality of slots (38). The hood defines a recess (44) and two apertures (48). The handle is slidably received in the recess, and has two hollow cylinders (58) extending through the apertures. The latch defines two through holes (64) for extension of two screws (66) therethrough to engage with the cylinders, thus securing the handle to the latch. The latch has a plurality of hooks (62) corresponding to the slots of the support bracket. When the latch is in a first position, the hooks are engaged at the slots. When the latch is moved to a second position, the hooks are released from the slots, whereupon the hood is easily removed from the chassis.

12 Claims, 5 Drawing Sheets

COMPUTER ENCLOSURE WITH HOOD LATCH

BACKGROUND OF THE INVENTION

1. Field of the Invention

The present invention relates to a computer enclosure, and particularly to a computer enclosure having a latched hood slidably and removably attached thereto.

2. Related Art

A conventional computer enclosure is generally comprised of a chassis, a hood and a bezel. The chassis is used to hold motherboards, interface cards, a power supply and disk drives. The chassis is generally U-shaped, and comprises a base, a front panel and a rear panel. The hood is also U-shaped and has a top panel and two opposite side panels depending from the top panel. The hood is slidingly attached to the chassis along rails formed on opposite sides of the chassis, and then secured to the rear panel by screws. Finally, the bezel is mounted on the front panel of the chassis.

Securing the hood to the rear panel with screws is unduly complicated and time-consuming. Furthermore, it is difficult to simultaneously align both side edges of the hood with the respective rails of the chassis.

Anther kind of conventional hood is secured to a chassis by means of engagement of locking barbs of the hood with slots of the chassis.

However, disengaging this hood from the chassis is complicated and laborious.

The above related art includes U.S. Pat. Nos. 5,159,528, 5,164,886, 5,271,152, and 5,491,611.

It is strongly desired to provide an enclosure for a computer system which overcomes the above problems encountered in the prior art.

SUMMARY OF THE INVENTION

Accordingly, an object of the present invention is to provide a computer enclosure which has a hood readily attached to and detached from the enclosure.

To achieve the above-mentioned object, an enclosure for a computer system in accordance with the present invention comprises a chassis, a hood, a handle and a latch attaching the hood to the chassis. A support bracket is secured in the chassis, and defines a plurality of slots therein. The hood defines a recess, an opening below the recess, and two apertures below the recess at one side of the opening. The handle is slidably received in the recess. A protrusion of the handle extends through the opening of the hood. The handle has two hollow cylinders extending through the apertures of the hood. The latch defines two through holes for extension of two screws therethrough to engage with the cylinders, thus allowing the handle to operate the latch. The latch has a plurality of hooks corresponding to the slots of the support bracket. When the latch is in a first position, the hooks are engaged with the slots. When the latch is moved to a second position, the hooks are released from the slots, whereupon the hood is easily removed from the chassis.

Other objects, advantages and novel features of the present invention will be drawn from the following detailed description of the preferred embodiment of the present invention with reference to the attached drawings, in which:

DESCRIPTION OF THE PREFERRED EMBODIMENT

Figure 1:
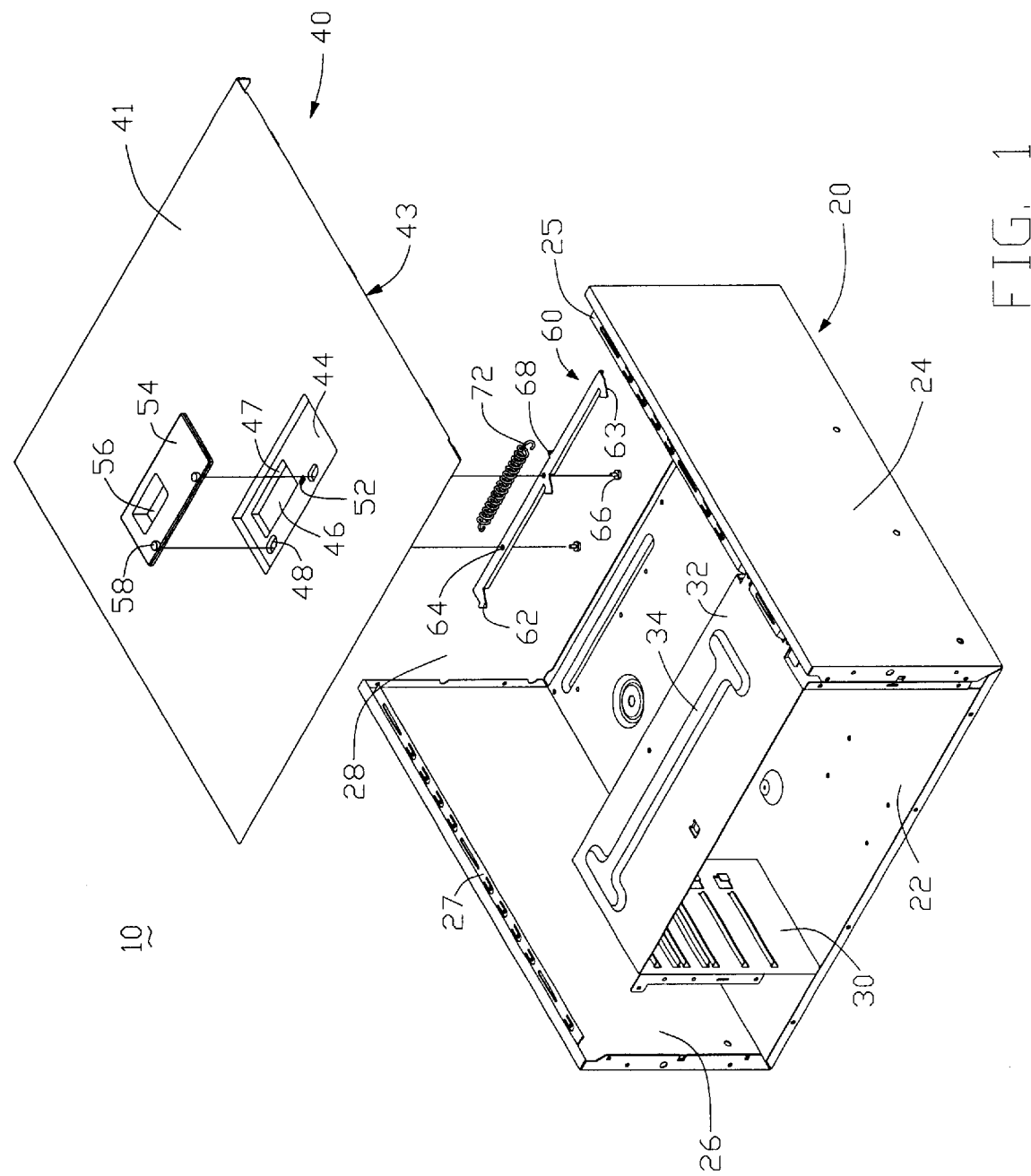
FIG. 1 is an exploded view of a computer enclosure in accordance with the present invention.

Referring to FIG. 1, a computer enclosure 10 in accordance with the present invention comprises a chassis 20, a hood 40, a handle 54, and a latch 60 attaching the hood 40 to the chassis 20.

The chassis 20 comprises a base 22, a first side wall 24, and a second side wall 26, all of which together define a space 28 therebetween. A pair of flanges 25, 27 extend perpendicularly inwardly from top portions of the first and second side walls 24, 26 respectively. A support bracket 30 is received in the space 28 and secured to the base 22 and the first side wall 24 by conventional means. The support bracket 30 has a top panel 32, and a rib 34 stamped upwardly from the top panel 32. A skirting plate 36 (see FIG. 4) extends perpendicularly inwardly from an inner longitudinal edge of the top panel 32. Three spaced slots 38 are defined in the skirting plate 36 adjacent the top panel 32 (see FIG. 4). A chamfer 37 is formed in the skirting plate 36 at one extremity of each slot 38 (see FIG. 5).

The hood 40 is a generally rectangular plate, and has a top surface 41 and a bottom surface 43. The top surface 41 is stamped downwardly to define a generally box-shaped recess 44. The top surface 41 is stamped downwardly below the recess 44 to form a peripheral plate 47 and an opening 46. A pair of apertures 48 is defined in the top surface 41 below the recess 44, at one side of the opening 46. A catch 52 (see also FIG. 5) is downwardly formed in the top surface 41 below the recess 44, between the opening 46 and one aperture 48.

The handle 54 is stamped downwardly to form a protrusion 56, for being slidably received in the opening 46 of the hood 40. A pair of hollow cylinders 58 extends downwardly from the handle 54 near one longitudinal side thereof, for being slidably received in the apertures 48 of the hood 40. Each hollow cylinder 58 has a screw thread in an inner surface thereof.

The latch 60 is a generally elongated beam. Three hooks 62 are formed on one side of the latch 60, corresponding to the slots 38 of the support bracket 30. One edge of a free end of each hook 62 defines a slope 63 (see also FIG. 2). A pair of through holes 64 is defined in the latch 60, corresponding to the hollow cylinders 58 of the handle 54. A tab 68 is formed on a side of the latch 60 which is opposite to the side of the latch 60 having the hooks 62. A retaining hole 70 (see FIG. 2) is defined in the tab 68. A spring 72 is engagable with the retaining hole 70 and the catch 52 of the hood 40. A pair of screws 66 attaches the latch 60 to the handle 54.

Figure 2:
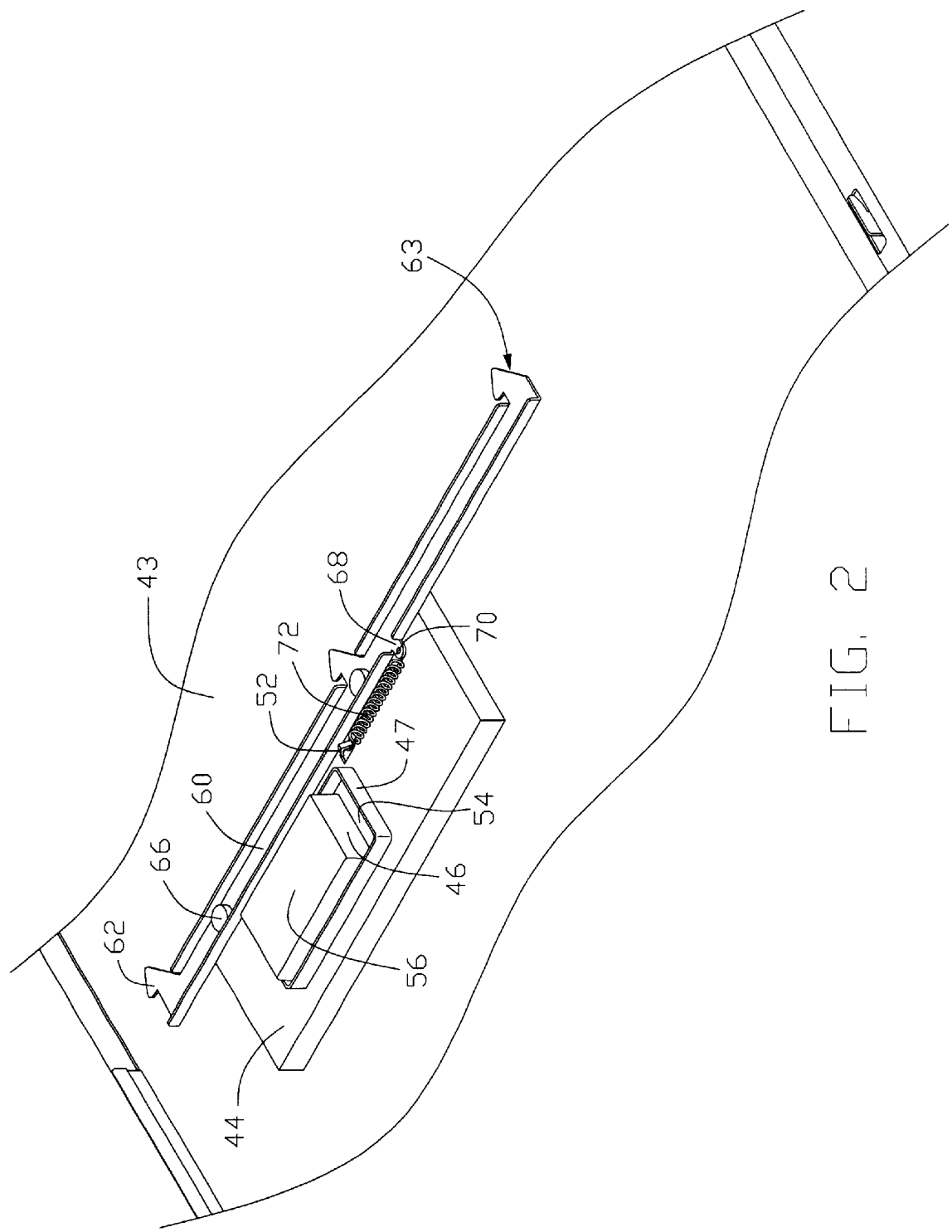
FIG. 2 is a view of a latch, a handle and part of a hood of FIG. 1 combined in pre-assembly, and viewed from another aspect.

Referring also to FIG. 2, in pre-assembly, the handle 54 is slidably received in the recess 44 of the hood 40. The protrusion 56 of the handle 54 extends through the opening 46 of the hood 40, and the hollow cylinders 58 of the handle 54 are slidably received in the apertures 48 of the hood 40. The screws 66 are extended through the through holes 64 of the latch 60 to engage with the hollow cylinders 58 of the handle 54. Thus the latch 60 is retained below the recess 44 of the hood 40. One end of the spring 72 is then retained in the retaining hole 70 of the latch 60, and the other end of the spring 72 is retained around the catch 52 of the hood 40.

Figure 3:
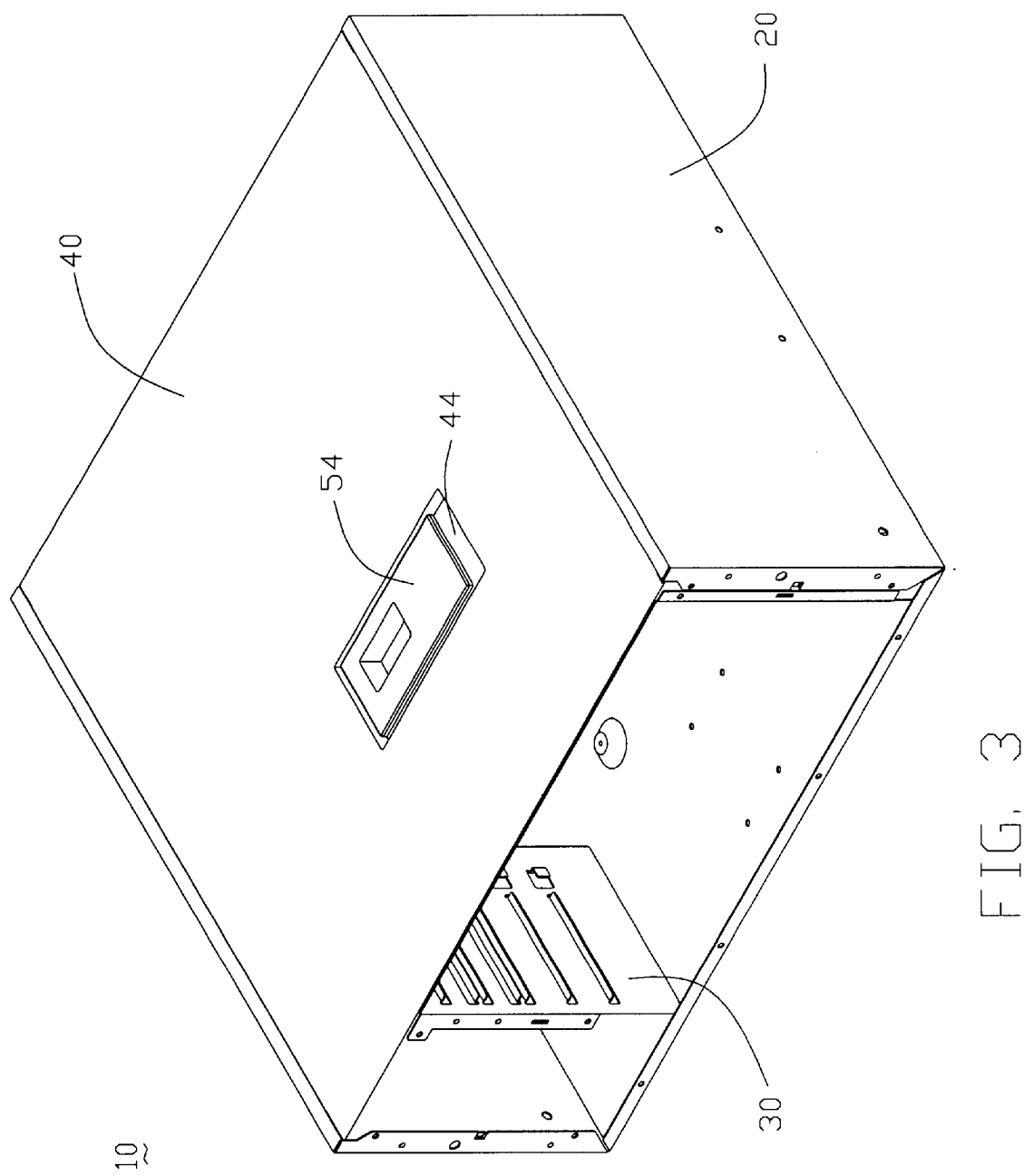
FIG. 3 is an assembled view of FIG. 1.

Referring also to FIG. 3, in assembly, the hood 40 with the latch 60 retained thereunder is slidingly mounted to the chassis 20 along the flanges 25, 27 of the chassis 20 until the hooks 62 of the latch 60 engage with the skirting plate 36 of the support bracket 30 at the retaining slots 38. The rib 34 of the support bracket 30 abuts the bottom surface 43 of the hood 40. At this stage, the latch is defined to be in a first position.

Figure 4:
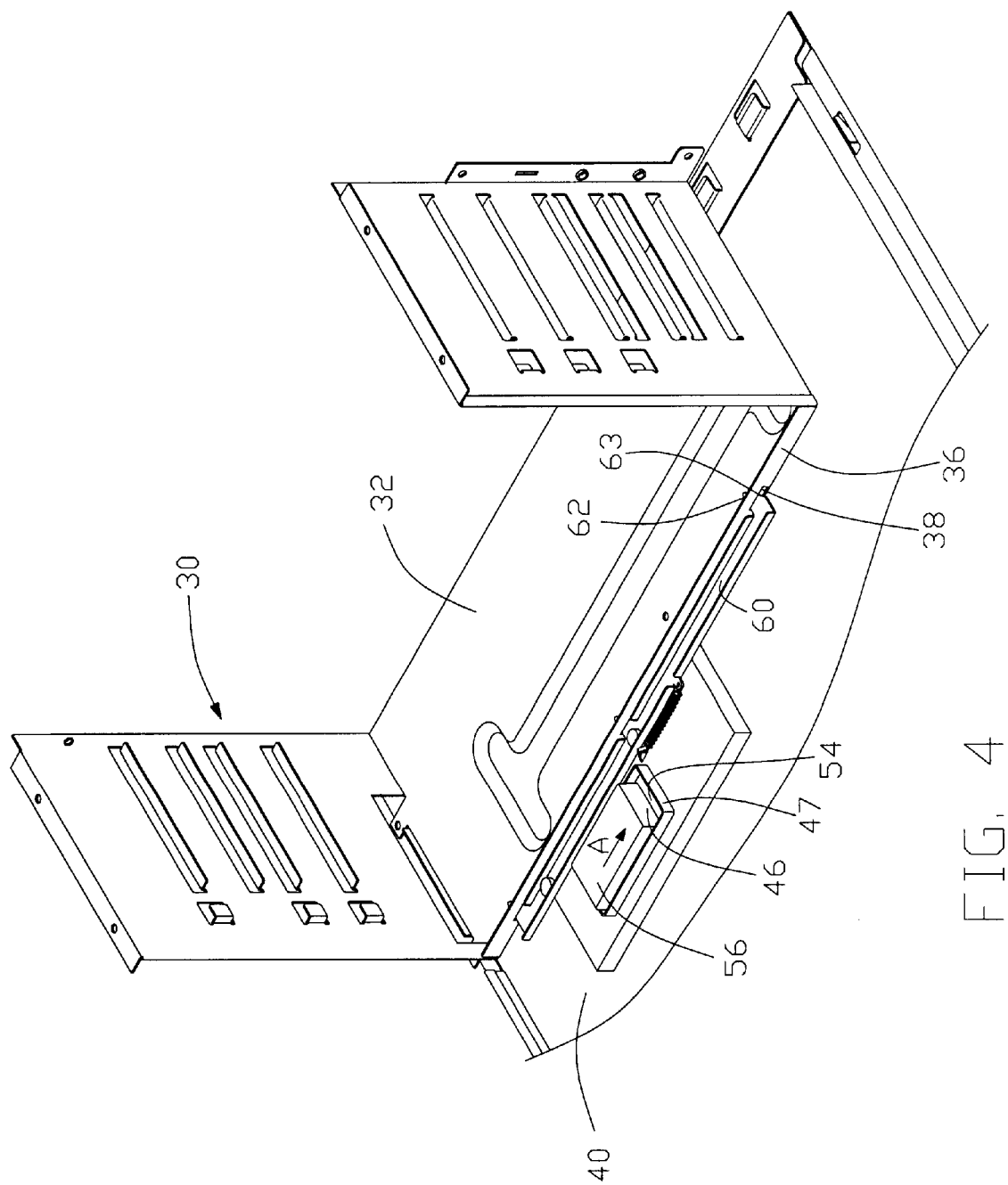
FIG. 4 is a view of part of FIG. 3 but viewed from another aspect, showing the latch engaged with a support bracket of FIG. 1.
Figure 5:
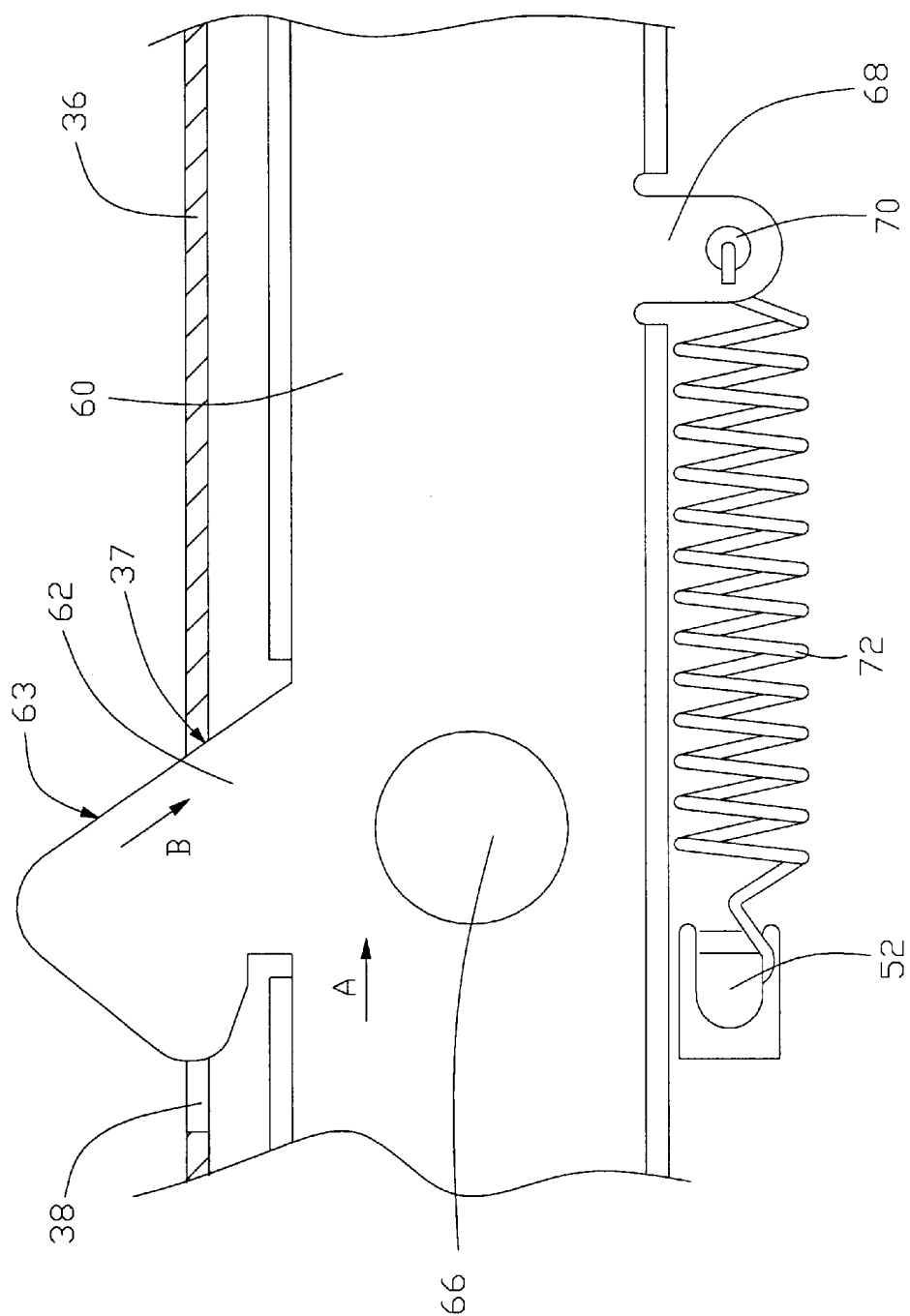
FIG. 5 is a top plan view of part of FIG. 4, showing the latch disengaging from the support bracket.

Referring also to FIGS. 4 and 5, in disassembly, the handle 54 is moved in direction A within the recess 44. The latch 60 is thus simultaneously moved in direction A. The slopes 63 of the hooks 62 of the latch 60 slide sideways in direction B along the chamfers 37 at the slots 38 of the support bracket 30. Consequently, the latch 60 is moved away from the support bracket 30. The hood 40 is pushed backward by the latch 60, and the spring 72 is stretched. The handle 54 is continued to be moved in direction A until the protrusion 56 thereof abuts the peripheral plate 47 of the hood 40. At this point, the hooks 62 of the latch 60 have completely slid out from the slots 38 of the support bracket 30. The hood 40 is thus released from the chassis 20. The spring 72 then spontaneously returns to its normal length, thus returning the handle 54 and the latch 60 to their original positions relative to the hood 40. At this stage, the latch is defined to be in a second position. The hood 40 is then readily removed from the chassis 20.

It is understood that the invention may be embodied in other forms without departing from the spirit thereof. Thus, the present example and embodiment are to be considered in all respects as illustrative and not restrictive, and the invention is not to be limited to the details given herein.

What is claimed is:

1. A computer enclosure comprising:
    a chassis with a support bracket secured therein, the support bracket defining at least one slot; and
    a hood with a latch movably attached thereunder, the latch having at least one hook, wherein when the latch is in a first position the at least one hook is engaged with the at least one slot thereby engaging the hood with the chassis, and when the latch is moved to a second position the at least one hook is disengaged from the at least one slot thereby releasing the hood from the chassis, wherein
    the hood includes a recess and an opening slidably receiving a handle with a protrusion, the handle has at least one hollow cylinder, the hood defines at least one aperture for extension of the cylinder therethrough, and the latch defines at least one through hole for extension of at least one screw therethrough to engage with the at least one cylinder.

2. The computer enclosure as claimed in claim 1, wherein each hook has a slope, for sliding along the support bracket at the corresponding slot when the latch is moved from the first position to the second position.

3. The computer enclosure as claimed in claim 1, wherein the hood includes a catch retaining one end of an elastic member, and the latch defines a retaining hole retaining another end of the elastic member, thereby facilitating engagement of the hood with the chassis at the first position.

4. The computer enclosure as claimed in claim 3, wherein the elastic member is a spring.

5. A computer enclosure comprising:
    a chassis with a support bracket secured therein, the support bracket defining at least one slot; and
    a hood with a latch movably attached thereunder, the latch having at least one hook, wherein when the latch is in a first position the at least one hook is engaged with the at least one slot thereby engaging the hood with the chassis, and when the latch is moved to a second position the at least one hook is disengaged from the at least one slot thereby releasing the hood from the chassis, wherein
    the hood includes a catch retaining one end of an elastic member, and the latch defines a retaining hole retaining another end of the elastic member, thereby facilitating engagement of the hood with the chassis at the first position.

6. The computer enclosure as claimed in claim 5 further comprising a handle with a protrusion, wherein the hood includes a recess receiving the handle and an opening receiving the protrusion, and the handle and the latch are secured together and are movable relative to the hood.

7. The computer enclosure as claimed in claim 6, wherein the handle has at least one hollow cylinder, the hood defines at least one aperture for extension of the cylinder therethrough, and the latch defines at least one through hole for extension of at least one screw therethrough to engage with the at least one cylinder.

8. A computer enclosure comprising:
    a chassis with a support bracket secured therein, the support bracket defining a slot;
    a hood releasably attached to the chassis; and
    a latch movably attached under the hood, the latch having a hook, wherein when the latch is in a first position the hook is engaged with the slot thereby engaging the hood with the chassis, and when the latch is moved to a second position the hook is disengaged from the slot and the latch is moved simultaneously away from the support bracket to push the hood backward, thereby releasing the hood from the chassis.

9. The computer enclosure as claimed in claim 8 further comprising a handle with a protrusion, wherein the hood includes a recess receiving the handle and an opening receiving the protrusion, and the handle and the latch are secured together and are moveable relative to the hood.

10. The computer enclosure as claimed in claim 9, wherein the handle has a hollow cylinder, the hood defines an aperture for extension of the cylinder therethrough, and the latch defines a through hole for extension of a screw therethrough to engage with the cylinder.

11. The computer enclosure as claimed in claim 8, wherein the hood includes a catch retaining one end of an elastic member, and the latch defines a retaining hole retaining another end of the elastic member, thereby allowing the latch and the hood to return to the first position from the second position.

12. The computer enclosure as claimed in claim 8, wherein the hook has a slope sliding along the support bracket at the slot when the latch is moved from the first position to the second position.

* * * * *